United States Patent [19]

Freeman et al.

[11] Patent Number: 4,787,048

[45] Date of Patent: Nov. 22, 1988

[54] POSTAL WEIGHING APPARATUS AND METHOD

[75] Inventors: Gerald C. Freeman, Darien; Seymour Feinland, Stamford, both of Conn.

[73] Assignee: Pitney Bowes Inc., Stamford, Conn.

[21] Appl. No.: 909,151

[22] Filed: Sep. 19, 1986

[51] Int. Cl.⁴ .............................................. G06F 15/20
[52] U.S. Cl. ...................................... 364/466; 177/25; 364/567
[58] Field of Search .................... 177/25.15; 364/464, 364/466, 508, 567

[56] References Cited

U.S. PATENT DOCUMENTS

| | | | |
|---|---|---|---|
| 3,965,815 | 6/1976 | Lupkus et al. | 101/91 |
| 3,978,457 | 7/1976 | Check et al. | 364/900 |
| 4,050,374 | 9/1977 | Check | 101/91 |
| 4,241,407 | 12/1980 | Sookikian et al. | 364/466 X |
| 4,286,325 | 8/1981 | Dlugos et al. | 364/900 X |
| 4,287,825 | 9/1981 | Eckert et al. | 101/91 |
| 4,302,821 | 11/1981 | Eckert et al. | 364/900 |
| 4,347,903 | 9/1982 | Yano et al. | 364/567 X |
| 4,379,495 | 4/1983 | Cocks et al. | 364/466 X |
| 4,412,298 | 10/1983 | Feinland et al. | 364/567 |
| 4,504,915 | 3/1985 | Daniels et al. | 364/466 |
| 4,691,290 | 9/1987 | Griffen | 364/567 |

*Primary Examiner*—Parshotam S. Lall
*Assistant Examiner*—Edward R. Cosimano
*Attorney, Agent, or Firm*—Peter Vrahotes; Melvin J. Scolnick; David E. Pitchenik

[57] ABSTRACT

A postal scale having an improved response time to determine appropriate postage amounts and including an improved postal weighing algorithm. The scale includes a transducer which produces a sequence of digital output signals representative of the instantaneous response of a scale and a microprocessor which detects the presence of mail pieces on the scale and determines estimates of the weight of the mail pieces as a function of subsequences of digital output signals, and uses these estimates to determine appropriate postage amounts. The algorithm used in the scale of the subject invention takes advantage of the fact that postal rate charts (i.e. postal rates as a function of weight) are, in general, step-like (i.e. are constant over ranges between predetermined weight breakpoints). The processor examines sequences of digital output signals and makes a first estimate of the weight of the mail pieces and determines the distance from the first estimate to the closest breakpoint. If the distance is sufficiently great the first estimate may be used safely to determine the appropriate postage amount. If the distance is close a second more accurate estimate is then made and used to determine the appropriate postage amount.

28 Claims, 3 Drawing Sheets

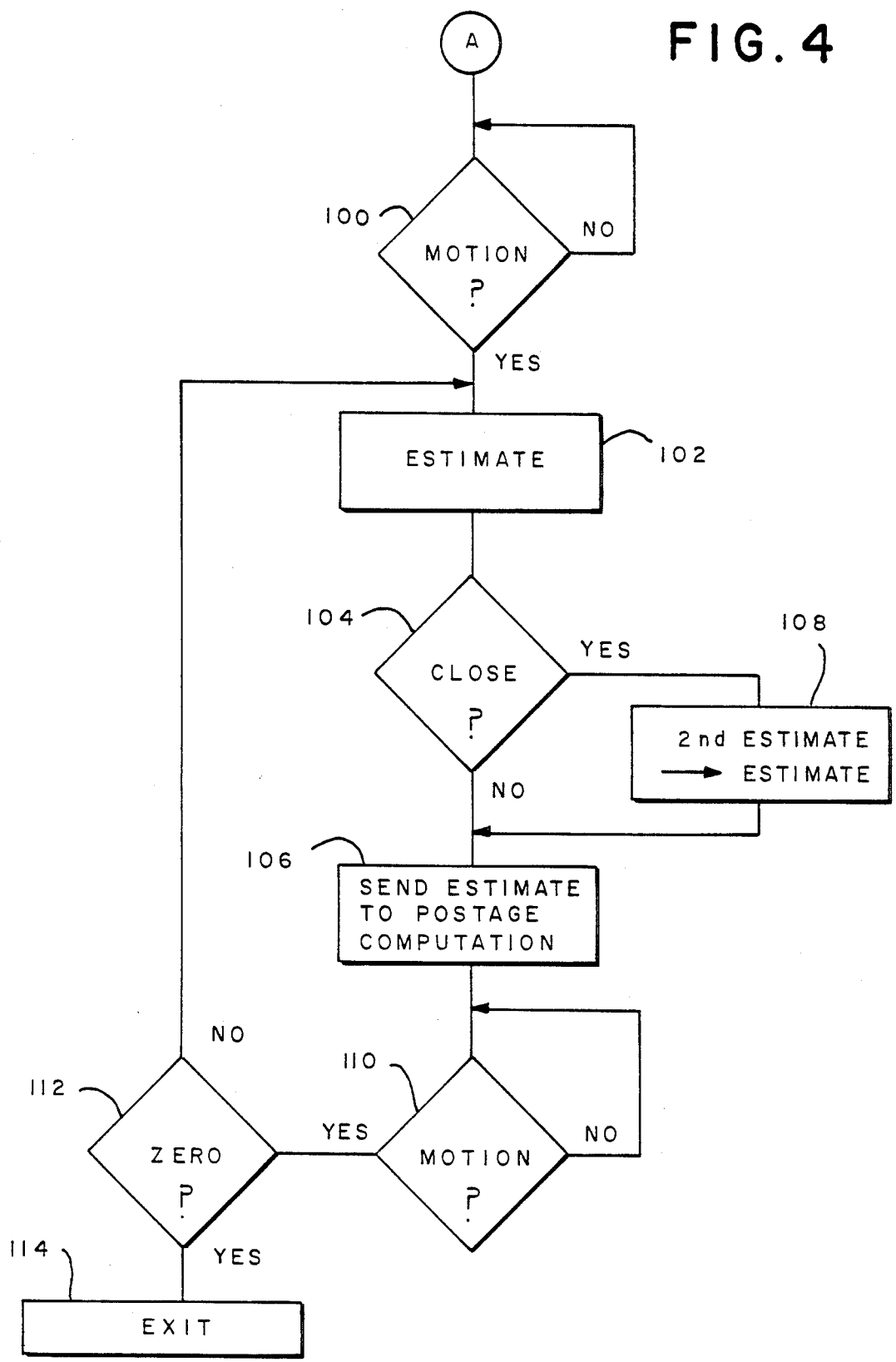

4,787,048

POSTAL WEIGHING APPARATUS AND METHOD

BACKGROUND OF THE INVENTION

1. Field of the Invention.

The subject invention relates to digital scales. More particularly, it relates to digital postal scales.

Digital postal scales are well known. Such scales are generally microprocessor controlled and generate a digital signal representative of the weight of a mail piece (i.e., an item to be mailed). The microprocessor determines the appropriate postage amount for the mail piece. As a function of the weight signal and other informtion input by an operator (e.g., class of service), in accordance with a predetermined algorithm. Details of the computation of such postage amounts are taught in U.S. Pat. No. 4,286,325; to: Dlugos et al.; for: SYSTEM AND METHOD FOR COMPUTING DOMESTIC AND INTERNATIONAL POSTAGE; issued: Aug. 25, 1981.

Despite the rapid development of microprocessors and their ability to rapidly process data, the rate at which known postal scales can process mail pieces is limited by the rate at which the scales can determine the weight of a mail piece, as will be described further below. Thus the time required to determine the appropriate postage amount for a mail piece might typically be of the order of seconds, even though determination of the postage amounts per se would be essentially instantaneous once the weight was determined.

Prior approaches to the problem of improving the response of digital postal scales have included mechanical structures which would more rapidly return to a stable state after a mail piece was placed on the scale, and mathematical/statistical techniques used to attempt to "predict" the ultimate stable state relatively early in the response of the scale. Such attempts have naturally intended to increase both the complexity and cost of digital postal scales.

Thus it is an object of the subject invention to decrease the average time required for a digital postal scale to determine the appropriate postage amount for a mail piece.

It is a further object to decrease the average determination time for a digital postal scale without mechanical change to the scale.

It is another object of the subject invention to decrease the average determination time of a digital postal scale in a manner which is simple and inexpensive to implement.

BRIEF SUMMARY OF THE INVENTION

The above objects are achieved and the disadvantages of the prior art are overcome in accordance with the subject invention by a postal scale for determining appropriate postage amounts for mail pieces as a function of the weights of the mail pieces, the postage amount function having a constant value over at least one range between two predetermined weight breakpoints, which scale includes: a platform for supporting the mail pieces; a transducer apparatus for generating a sequence of digital output signals representative of the instantaneous response of the platform; and a processor. The processor receives the digital output signals and processes them to: first detect the presence of a mail piece on the platform; then make a first estimate of the weight of the mail pieces; then test the first estimate to determine if it is are within a range and if the distance from the closest of the breakpoints is greater than a predetermined amount; then, if the first estimate satisfies the test, uses the first estimate to determine the postage amount for the mail piece; or then, if the first estimates fail the test, makes second, more accurate, estimates of the weights and uses the second estimates to determine the postage amounts.

In a preferred embodiment of the subject invention, the first estimate is based on a subsequence of digital output signals having a first length and the second estimate is based on a second subsequence having a second, greater, length.

In another preferred embodiment the first and second estimates are made by examining all subsequences having a predetermined length occuring after a specified time, selecting the first subsequence where the difference between the maximum and minimum values of the digital output signals is less than a threshold, the threshold being greater for the first estimate; and setting the estimates equal to a function of the values of the selected subsequence, the function being chosen so that the estimates are between the maximum and minimum values.

In another preferred embodiment the transducer apparatus of the subject invention includes a analog-to-digital convertor which is operated at a higher, less accurate, conversion rate for the first estimate.

In still another preferred embodiment of the subject invention the first estimate is a mathematical prediction based on a subsequence of said digital output signals.

Because the first less accurate estimates may be made at an early time after a mail piece is placed on the scale, and because high accuracy in the estimates of the weight of the mail pieces is only necessary near the breakpoints in the postage function, those skilled in the art will recognize from the above description that the subject invention advantageously achieves the above described objects in increasing the rate at which mail pieces can be processed by a postal scale.

Other objects and advantages of the subject invention will be apparent to those skilled in the art from consideration of the attached drawings and of the detailed description set forth below.

BRIEF DESCRIPTION OF THE DRAWINGS

FIG. 4 is a flow chart of the weighing algorithm of the subject invention.

DETAILED DESCRIPTION OF THE PREFERRED EMBODIMENT

Figure 1:
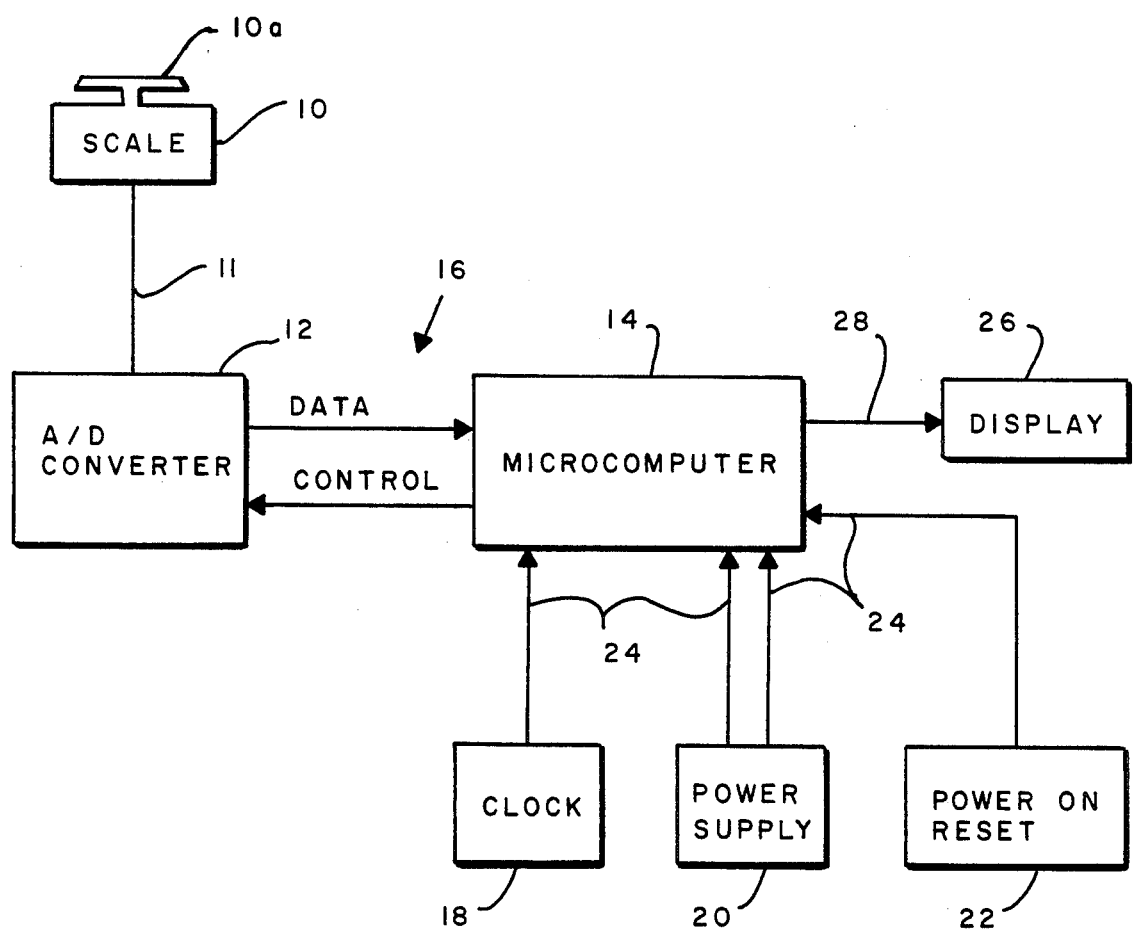
FIG. 1 shows a block diagram of a postal scale.

In FIG. 1 a microprocessor-driven postal scale is shown. A weighing scale 10 is connected by means of output line 11 to an analog-to-digital (A/D) convertor 12. Scale 10 includes an analog transducer which converts the response of scale platform 10a (i.e., the displacement) to an electrical analog signal. Typically, the analog transducer may be a load cell. A/D convertor 12 and its associated control logic (not shown) is electrically connected to, and controlled by, microprocessor 14 by means of suitable input and output lines, shown generally at reference numeral 16. Convertor 12 provides a sequence of digital output signals representative of the instantaneous response of scale 10.

Microprocessor 14 is, in turn, connected to conventional clock 18, power supply 20, and power on reset 22 by means of suitable input lines shown generally at reference numeral 24. Microprocessor 14 is further connected to a conventional display 26, and drives display 26 over output line 28 to display weights, postage amounts, and other information as necessary.

In general, the control of scale 10 and A/D convertor 12 to determine the weights of mail pieces is well known in the art and is described, for example, in U.S. Pat. No. 4,412,298; to: Feinland et al.; for: METHOD FOR TRACKING CREEP AND DRIFT IN A DIGITAL SCALE UNDER FULL LOAD; issued: Oct. 25, 1983.

Figure 2:
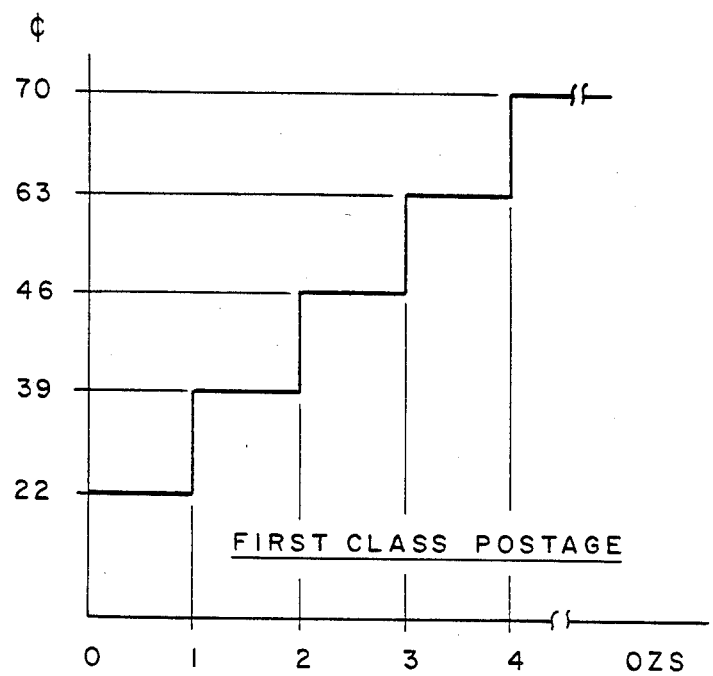
FIG. 2 shows a portion of the current first class postage rate chart.

FIG. 2 shows a portion of the current first class postage chart. That is, a graph of postage amounts for mail pieces as a function of the weight of the mail pieces for first class postal service. The function shown in FIG. 2 is representative of postage charts in general in that it is a piecewise constant function which is constant over a plurality of ranges and changes only at predetermined weight breakpoints.

Though numerous inventive schemes have been developed for the general determination of appropriate postage amounts, such as that disclosed in the above referenced U.S. Pat. No. 4,504,915, inspection of FIG. 2 shows the simplicity of the fundamental determination of a postage amount. Once the weight of a mail piece has been determined the appropriate postage amount is immediately determined by the range in to which that weight falls. Further, because such ranges are, in general, large with respect to the required weight accuracy of postal scales, the required accuracy is only necessary near the breakpoints. Thus in FIG. 2 ranges of one ounce are shown while postal scales typically have an accuracy of 1–32nd of an ounce to determine postage for a mail piece.

In general it may be expected that only a small fraction of mail pieces will fall in the narrow regions around the breakpoints where the full accuracy of a postal scale is required. As will be described further below, the subject invention takes advantage of this heretofore unnoted fact to implement a postal scale with a novel weighing algorithm to achieve a higher rate of processing mail pieces.

Figure 3:
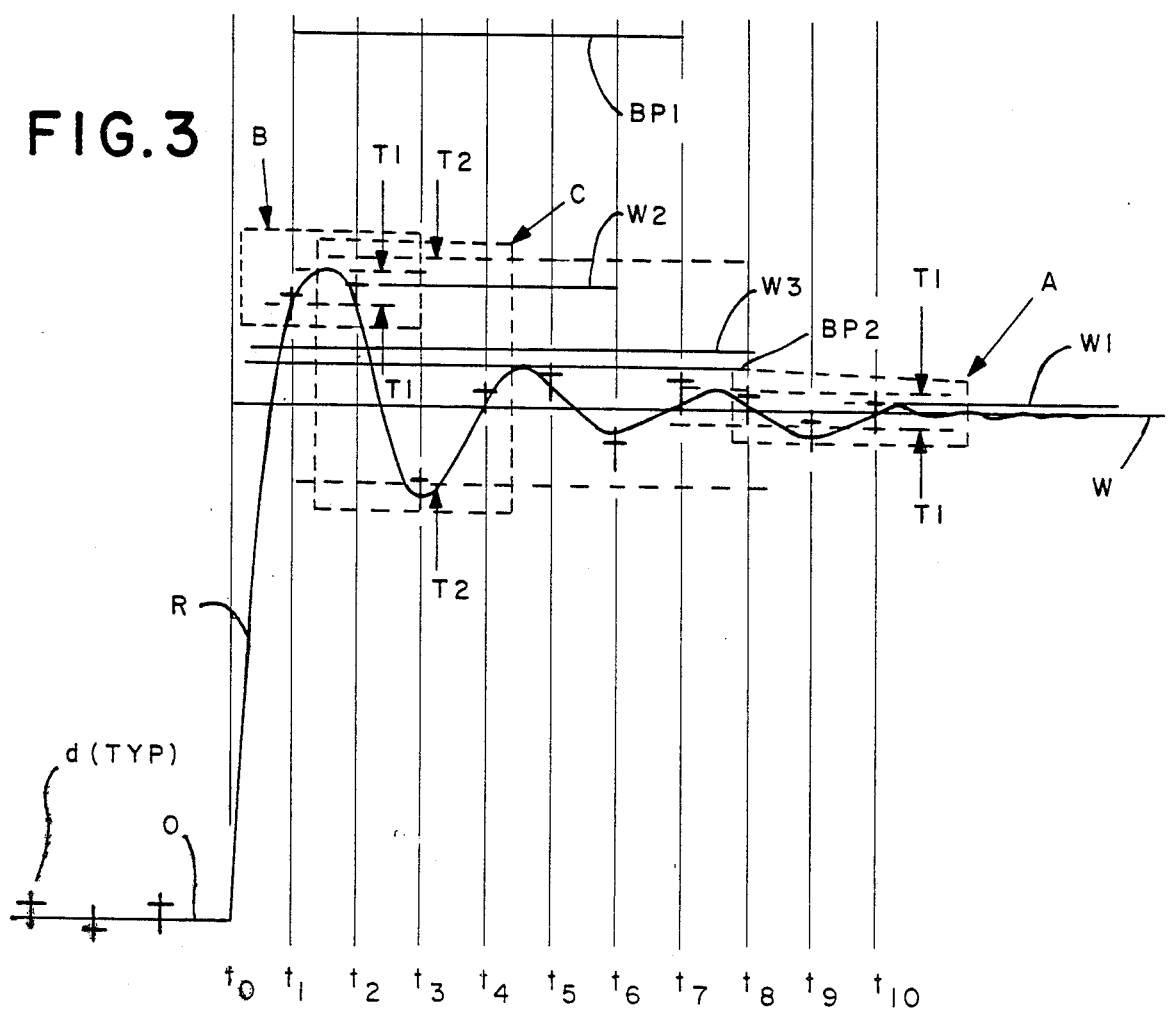
FIG. 3 shows the response of a scale to an object placed on the scale at time $t_o$.

FIG. 3 shows the ideal response R of scale 10 to the application of a mail piece at time $t_o$. Also shown plotted on response R are digital output signals d produced by A/D convertor 12. Primarily because of imperfections and noise in scale 10 and A/D convertor 12 and external vibrations signals d will vary randomly around response R.

Prior to time $t_o$ signals d will vary about a zero level. Between times $t_o$ and $t_1$ microprocessor 14 will detect a rapid, large change in the values of signals d. As described in the above referenced U.S. Pat. No. 4,412,298 this change signals microprocessor 14 that a mail piece has been placed on scale 10. Microprocessor 14 now begins to examine the sequence signals d to determine the weight of the mail piece. As can be seen from FIG. 2 ideal response R approaches weight W asymptotically. However, it will be understood that because of the random variation in signals d a sequence of signals d all equal to weight W is statiscally essentially impossible. Microprocessor 14 therefore looks for a subsequence of a predetermined length of signals d which are separated by no more than a predetermined threshold amount. At A in FIG. 3 a sequence of three signals d ($t_8$, $t_9$, $t_{10}$) separated by no more than amount T1 is shown. Having found such a subsequence an estimate w1 for weight is determined as a function of the subsequence. The exact nature of the function is not critical so long as the estimate falls between, or at, the maximum and minimum of the values of the subsequence, and may be, for example, the mean, or the median, or the mid-point; or simply the 1st value in the sequence.

In general the length of the subsequence sought by microprocessor 14 will be three or greater. The reason for this can be seen in region B of FIG. 2 where a subsequence ($t_1$, $t_2$) of a length two falls within threshold T1 and would yield substantially more inaccurate estimate w2. However, examination of FIG. 2 also shows that if the nearest weight breakpoint is at BP1 the inaccuracy of estimate w2 is not critical. On the other hand, if the nearest weight breakpoint is at BP2, closer to estimate w2 the inaccuracy becomes more critical, and in fact w2 would give the wrong postage amount.

With reference to FIGS. 3 and 4 an improved algorithm for determining appropriate postage amounts is shown. This algorithm takes advantage of the step-like nature of postal rate charts as shown in FIG. 2. For completeness we may assume that the following discussion refers to a rate chart similar to that shown in FIG. 2 with weight breakpoints at 1, 2, 3, etc. ounces. At the point A in FIG. 4 the appropriate rate chart defining the breakpoints has been selected in accordance with information input by an operator. At 100 processor 14 examines the sequence of digital output signals d to detect motion (i.e., the excursion of the digital output signals d away from a predefined band around the zero level). Between times $t_0$ and $t_1$ motion is detected and processor 14 begins to search for a subsequence of signals d which may be used to estimate weight W. For a first estimate two signals d differing by no more than an amount T1 are sought as shown in region B in FIG. 3. Signals d in region B (i.e., those at times $t_1$ and $t_2$ may be combined to generate an estimate w2 of weight W. As noted above, this estimate may be the mean, median, or mid-point of the subsequence.

As may be seen in FIG. 3 estimate w2 is substantially different from weight W. However, if the difference between estimate w2 and the nearest weight breakpoint, assumed to be BP1, is sufficient estimate w2 may be used to compute the postage amount without error. On the other hand, if the closest breakpoint is assumed to be BP2, substantially closer to estimate w2, the possibility of error is substantially greater.

More precisely, if, from knowledge of scale 10, we know that the likelihood that the error in estimate in w2 being greater than some amount, assume one-eighth of an ounce for illustration, is sufficiently small, we may have sufficient confidence in estimate w2 to use it to compute the appropriate postage amount if the distance from estimate w2 to the closest weight breakpoint is greater than one-eighth of an ounce. Accordingly, at 104 in FIG. 4 the estimate taken at 102 is tested against the closest weight breakpoint. If the estimate is not "close" at 106 it is sent to the postage computation routine to be used to determine the appropriate postage amount.

If estimate w2 is close a second estimate is substituted for the first estimate at 108. The second estimate is based on a subsequence of three signals d which differ by no more than amount T1 as shown at A in FIG. 3. Because three successive signals d cannot stradle a peak or valley of response R as occurred at B it is highly improbable that a subsequence satisfying this second test will be found until response R has decayed much closer to weight W. Once identified the second subsequence may be used to generate a second estimate w1, which is then used to generate the postage amount at 106.

After the postage amount is determined processor 14 again checks for motion at 110. When motion is detected processor 14 checks to determine if scale 10 has returned to zero at 112. If scale 10 has not returned to zero it is assumed that the weight of the mail piece has changed for some reason (e.g. the operator has removed his hand from scale 10) and the program returns to 102. If scale 10 has returned to zero the program exits at 114.

The first estimate made at 102 in FIG. 4 may be made in other ways. Thus at C in FIG. 3 a first estimate may be made based on a subsequence differing by no more than an amount T2, which is greater than amount T1. Estimate w3 is based on the subsequence of length 3 ($t_2$, $t_3$, $t_4$) in region C.

In another embodiment of the subject invention the first estimate at 102 may be made using a conventional programmable A/D convertor. Such convertors operate at either a first, more rapid and less accurate rate, or a second, slower and more accurate rate. Such a convertor would be controlled by microprocessor 14 and the first estimate at 102 would be made at the higher rate.

In another embodiment of the subject invention the first estimate at 102 may be made by taking advantage of the fact that ideal response R may be described in analytical form from a knowledge of the spring rate and damping of scale 10, and principles of mechanics. Given the analytical form of response R weight W may be mathematically predicted by approximating parameters of response R from an early subsequence of signals d.

For example, it is known that the overshoot (i.e. the first peak) is proportional to weight w assuming the mail piece is placed on platform 10a "gently" (i.e. with negligible kinetic energy). Thus, if the overshoot can be estimated from early signals d an approximation for weight W can be computed.

Other embodiments of the subject invention will be apparent to those skilled in the art from consideration of the attached drawings and the detailed description set forth above. Therefore, it is to be understood that the above detailed descriptions have been provided by way of illustration only and are not to be considered limiting. Limitations on the subject invention are to be found only in the claims set forth below.

What is claimed is:

1. A postal scale for determining the appropriate postage amount for a mailpiece as a function of the weight of said mailpieces, said postage amount function having a constant value over at least one range between two predetermined weight breakpoints, comprising:
   (a) means for supporting said mailpiece;
   (b) transducer means for generating a sequence of digital output signals representative of the instantaneous response of said support means; and
   (c) processing means for, in response to said digital output signals:
      (c1) detecting the presence of said mailpiece on said support means;
      (c2) then making a first estimate of the weight of said mailpiece;
      (c3) then testing said first estimate to determine if it is within one of said ranges and if the distance from the closest of said breakpoints exceeds a predetermined amount; and
      (c4) then, if said first estimate satisfies said test, using said first estimate to determine said postage amount for said mailpiece; or, if said first estimate fails to satisfy said test, making a second more accurate estimate of the weight of said mailpiece, and using said second estimate to determine said postage amount.

2. A postal scale as described in claim 1 wherein said transducer means further comprises an analog-to-digital convertor responsive to said processing means to select between a higher, less accurate, conversion rate and a lower, more accurate conversion rate, and wherein said processor means controls said analog-to-digital convertor to operate a said higher conversion rate to make said first estimate and at said lower conversion rates to make said second estimate.

3. A postal scale as described in claim 1 wherein said estimates are made by:
   (a) examining all subsequences having a predetermined length occuring after a selected time;
   (b) identifying the maximum and minimum values in said examined subsequences and subtracting said minimum values from said maximum values to determine differences;
   (c) selecting a first value for a threshold to make said first estimate and a second, smaller value for said threshold to make said second estimate;
   (d) determining if said differences exceed said threshold and selecting the first of said examined subsequences for which said difference does not exceed said threshold; and,
   (e) setting said estimates equal to a function of the values of said selected subsequence, said function is chosen so that said estimates are between said maximum and said minimum.

4. A postal scale as described in claim 3 wherein said function is chosen as the mean of said values in said selected subsequence.

5. A postal scale as described in claim 3 wherein said function is chosen as the median of said values in said selected subsequence.

6. A postal scale as described in claim 3 wherein said function is chosen as the mid-point of said values in said selected subsequence.

7. A postal scale as described in claim 1 wherein said first estimate is based on a subsequence of said digital output signals having a first predetermined length and said second estimate is based on a second subsequence of said output signals having a second greater length.

8. A postal scale as described in claim 7 wherein said first predetermined length is two.

9. A postal scale as described in claim 7 wherein said estimate is made by:
   (a) examining all subsequences of said digital output signals having said predetermined lengths occuring after selected times;
   (b) identifying the maximum and minimum values in said examined subsequences and subtracting said minimum values from said maximum values to determine a differences,
   (c) determining if said differences exceed a predetermined threshold and selecting the first of said examined subsequences for which said difference does not exceed said threshold; and (d) setting said estimates equal to a function of the values in said selected subsequence, said function is chosen so that said estimates are at or between said maximum and said minimum.

10. A postal scale as described in claim 9 wherein said first predetermined length is two.

11. A postal scale as described in claim 10 wherein said function is chosen as the mean of said values in said selected subsequence.

12. A postal scale as described in claim 10 wherein said function is chosen as the median of said values in said selected subsequence.

13. A postal scale as described in claim 10 wherein said function is chosen as the mid-point of said values in said selected subsequence.

14. A method for determining appropriate postage amounts for a mailpiece as a function of the weight of said mail piece, said postage amount function having a constant value over at least one range between two predetermined weight breakpoints, comprising the steps of:
  (a) making a first estimate of the weight of said mailpiece;
  (b) then testing said first estimate to determine if it is within one of said ranges and if the distance from the closest of said breakpoints exceeds a predetermined amount; and
  (c) then, if said first estimate satisfies said test, using said first estimate to determine said postage amount for said mailpiece; or, if said first estimate fails to satisfy said test, making a second, more accurate, estimate of the weight of said mailpiece, and using said second estimate to determine said postage amount.

15. A method as described in claim 14 wherein said estimates are based on subsequences of digital output signals generated by an analog-to-digital convertor, said convertor responsive to control signals to select between a higher, less accurate, conversion rate and a lower, more accurate, conversion rate, and wherein further said analog-to-digital convertor operates at said higher conversion rate to make said first estimates, and at said lower conversion rates to make said second estimates.

16. A method as described in claim 14 wherein said estimates are made by:
  (a) examining subsequences of digital output signals having a predetermined length and occuring after a selected time;
  (b) identifying the maximum and minimum values in said examine subsequences and subtracting said minimum values from said maximum values to determine differences;
  (c) selecting a first value for a threshold to make said first estimate and a second, smaller value, for said threshold to make said second estimate;
  (d) determining if said differences exceed said threshold and selecting the first of said examined subsequences for which said difference does not exceed said threshold; and,
  (e) setting said estimates equal to a function of the values of said selected subsequence, said function is chosen so that said estimates are between said maximum value and said minimum value.

17. A method as described in claim 16 wherein said function is the mean of said values in said selected subsequence.

18. A method as described in claim 16 wherein said function is the median of said values in said selected sequence.

19. A method as described in claim 16 wherein said function is the mid-point of said values in said selected subsequence.

20. A method as described in claim 16 wherein said function is the last of said values in said selected subsequence.

21. A method as described in claim 14 wherein said first estimate is based on a subsequence of digital output signals having a first predetermined length and said second estimate is based on a second subsequence of said output signals, having a second, greater, length.

22. A method as described in claim 12 wherein said first predetermined length is two.

23. A method as described in claim 21 wherein said estimates are made by:
  (a) examining all subsequences of said digital output signals having said predetermined lengths and occuring after selected times;
  (b) identifying the maximum and minimum values in said examined subsequences and subtracting said minimum values from said maximum values to determine differences, determining if said differences exceed a predetermined threshold, and selecting the first of said examined subsequences for which said difference does not exceed said threshold; and,
  (c) settling said estimates equal to a function of the values in said selected subsequence, said function is chosen so that said estimates are between said maximum value and said minimum value.

24. A method as described in claim 23 wherein said first predetermined length is two.

25. A method as described in claim 24 wherein said function is chosen as the mean of said values in said selected subsequence.

26. A method as described in claim 24 wherein said function is chosen as the median of said values in said selected subsequence.

27. A method as described in claim 24 wherein said function is chosen as the mid-point of said values in said selected subsequence.

28. A method as described in claim 24 wherein said function is chosen as the last of said values in said selected subsequence.

* * * * *